United States Patent
Takahashi et al.

(10) Patent No.: US 11,071,108 B2
(45) Date of Patent: Jul. 20, 2021

(54) USER EQUIPMENT AND COMMUNICATION METHOD

(71) Applicant: NTT DOCOMO, INC., Tokyo (JP)

(72) Inventors: Hideaki Takahashi, Tokyo (JP); Hiromasa Umeda, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 28 days.

(21) Appl. No.: 15/897,495

(22) Filed: Feb. 15, 2018

(65) Prior Publication Data
US 2018/0176919 A1 Jun. 21, 2018

Related U.S. Application Data

(63) Continuation of application No. PCT/JP2017/003559, filed on Feb. 1, 2017.

(30) Foreign Application Priority Data

Feb. 4, 2016 (JP) .............................. JP2016-020331

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0094* (2013.01); *H04W 56/0005* (2013.01);
(Continued)

(58) Field of Classification Search
CPC ......... H04W 72/0453; H04W 56/0005; H04W 4/04; H04W 88/02; H04W 48/10; H04L 5/0094; H04L 5/0053; H04L 5/0044
See application file for complete search history.

(56) References Cited

U.S. PATENT DOCUMENTS

| 2004/0106430 A1* | 6/2004 | Schwarz | H04W 28/18 455/552.1 |
| 2011/0268087 A1* | 11/2011 | Kwon | H04L 5/001 370/331 |

(Continued)

FOREIGN PATENT DOCUMENTS

| EP | 3043610 A1 | 7/2016 |
| WO | 2015042858 A1 | 4/2015 |

(Continued)

OTHER PUBLICATIONS

Office Action issued in corresponding Canadian Application No. 2,993,140, dated Nov. 2, 2018 (4 pages).

(Continued)

*Primary Examiner* — Hashim S Bhatti
(74) *Attorney, Agent, or Firm* — Osha Bergman Watanabe & Burton LLP

(57) ABSTRACT

A user equipment for communicating with a base station in a radio communication system that supports narrow band communication is disclosed including a receiver that receives, from the base station via a first frequency band, information for identifying a second frequency band. A synchronization signal and broadcast information are transmitted on the first frequency band, and the synchronization signal and the broadcast information are not transmitted on the second frequency band. The user equipment further includes a processor that identifies a center frequency of the second frequency band based on the received information.

3 Claims, 12 Drawing Sheets

(51) Int. Cl.
H04W 56/00 (2009.01)
H04W 48/10 (2009.01)
H04W 88/02 (2009.01)
(52) U.S. Cl.
CPC .......... H04L 5/0044 (2013.01); H04L 5/0053 (2013.01); H04W 48/10 (2013.01); H04W 88/02 (2013.01)

(56) References Cited

U.S. PATENT DOCUMENTS

| | | | | |
|---|---|---|---|---|
| 2013/0039331 A1* | 2/2013 | Koorapaty | ............ | H04W 56/00 370/330 |
| 2016/0205692 A1* | 7/2016 | Zhang | ................... | H04W 48/12 370/329 |
| 2018/0212726 A1* | 7/2018 | Xue | ........................ | H04L 5/005 |
| 2019/0013897 A1* | 1/2019 | Chen | ..................... | H04L 1/0006 |
| 2019/0081722 A1* | 3/2019 | Takeda | .................. | H04W 72/04 |

FOREIGN PATENT DOCUMENTS

| | | |
|---|---|---|
| WO | 2015188848 A1 | 12/2015 |
| WO | 2017053024 A1 | 3/2017 |

OTHER PUBLICATIONS

Extended European Search Report issued for European Patent Application No. 17747443.4, dated Feb. 13, 2019 (13 pages).
Intel Corporation; "Multiple carrier operation for NB-IoT"; 3GPP TSG RAN WG2 NB-IoT Ad-Hoc Meeting R2-160501; Budapest, Hungary, Jan. 19-21, 2016 (2 pages).
Alcatel-Lucent, Alcatel-Lucent Shanghai Bell; "Considerations of Multi-Band NB-IoT"; 3GPP TSG RAN WG1 NB-IoT ad-hoc R1-160180; Budapest, Hungary, Jan. 18-20, 2016 (3 pages).
Office Action issued in corresponding Japanese Application No. 2016-020331, dated Apr. 11, 2017 (9 pages).
3GPP TS 36.300 version 13.2.0; "3rd Generation Partnership Project; Technical Specification Group Radio Access Network; Evolved universal Terrestrial Radio Access (E-UTRA) and Evolved Universal Terrestrial Radio Access Network (E-UTRAN); Overall description; Stage 2 (Release 13)"; Dec. 2015 (290 pages).
Ericsson; "NB-IoT—Improved Synchronization Channel Design"; 3GPP TSG-RAN WG1 #83, R1-157455; Anaheim, California, USA; Nov. 16-20, 2015 (8 pages).
CATT; "RS design for NB-IoT"; 3GPP TSG RAN WG1 NB-IoT Ad-Hoc Meeting, R1-160147; Budapest, Hungary; Jan. 18-20, 2016 (3 pages).
Nokia Networks, et al.; "NB-IoT Operation in Multiple PRBs"; 3GPP TSG RAN WG1 Meeting #84, R1-160447; St Julian's, Malta; Feb. 15-19, 2016 (7 pages).
Qualcomm Incorporated; "NB-IoT cell load management"; 3GPP TSG RAN WG2 NB-IoT Ad-Hoc Meeting, Tdoc R2-160483; Budapest, Hungry; Jan. 19-21, 2016 (4 pages).
Nokia Networks; "In-band design considerations"; 3GPP TSG-RAN WG1 NB-IoT AdHoc, R1-160173; Budapest, Hungary; Jan. 18-20, 2016 (4 pages).
International Search Report issued in the corresponding International Application No. PCT/JP2017/003559, dated Apr. 11, 2017 (5 pages).
Written Opinion issued in the corresponding International Application No. PCT/JP2017/003559, dated Apr. 11, 2017 (5 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Qualcomm Incorporated; "New Work Item: NarrowBand IOT (NB-IOT)"; 3GPP TSG RAN Meeting #69, RP-151621; Phoenix, USA, Sep. 14-16, 2015 (9 pages).
3GPP TS 36.101 V12.10.1; "3rd Generation Partnership Project; Technical Specification Group Radio Access Network; Evolved Universal Terrestrial Radio Access (E-UTRA); User Equipment (UE) radio transmission and reception (Release 12)"; Jan. 2016 (768 pages).
3GPP TS 36.331 V13.0.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2015 (507 pages).
Office Action issued in corresponding European Application No. 17747443.4, dated Aug. 21, 2019 (7 pages).
Lenovo; "On NB-IoT anchor carrier"; 3GPP TSG RAN WG1 NB-IoT AdHoc Meeting, R1-160121; Budapest, Hungary; Jan. 18-20, 2016 (4 pages).
Office Action issued in the counterpart Chinese Patent Application No. 201780002841.8, dated Mar. 18, 2020 (14 pages).
Office Action issued in corresponding European Application No. 17747443.4 dated Jul. 6, 2020 (6 pages).

* cited by examiner

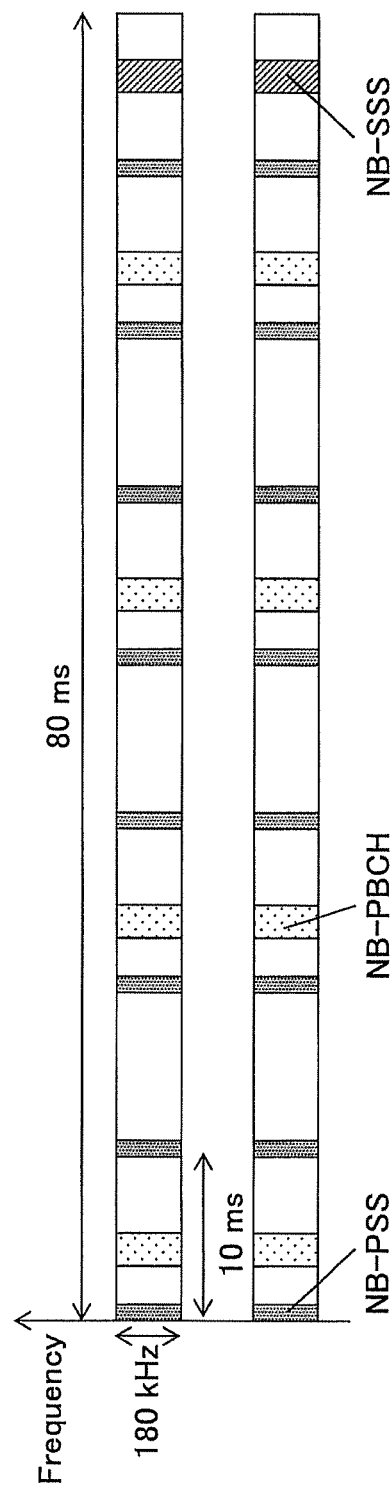

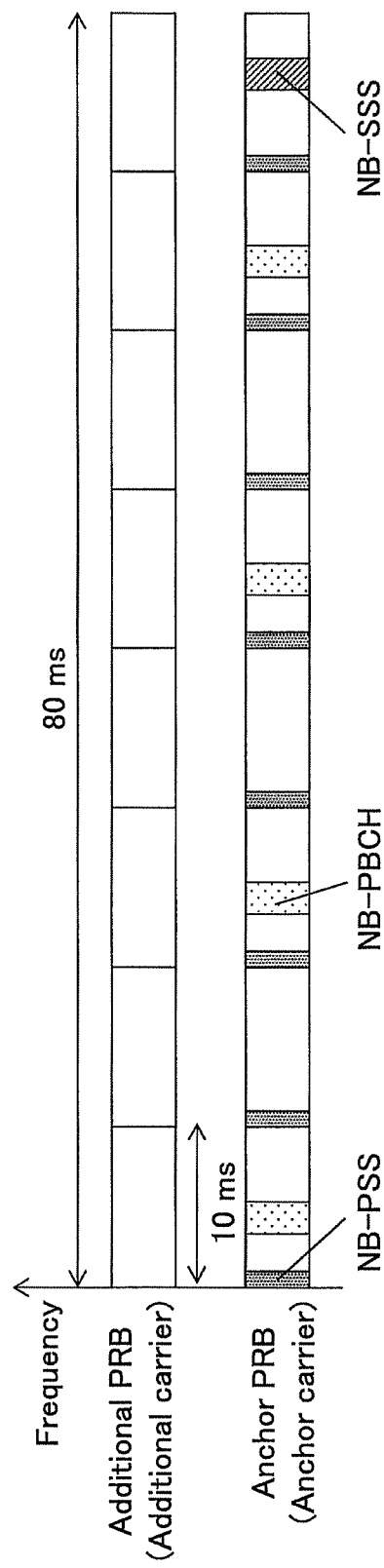

USER EQUIPMENT AND COMMUNICATION METHOD

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/003559 filed on Feb. 1, 2017 and designating the U.S., which claims priority of Japanese Patent Application No. 2016-020331 filed on Feb. 4, 2016. The entire contents of the foregoing applications are incorporated herein by reference.

BACKGROUND OF THE INVENTION

1. Field of the Invention

The present disclosure relates to user equipment and a communication method.

2. Description of the Related Art

For a Universal Mobile Telecommunications System (UMTS) network, specifications of Long Term Evolution (LTE) have been developed so as to achieve objects, such as higher data rate and lower latency (Non-Patent Document 1). Furthermore, in order to achieve objects of adopting a wider bandwidth and a higher data rate, successor systems of LTE (which are also referred to as LTE-Advanced (LTE-A), Future Radio Access (FRA), 4G, 5G, and so forth, for example) have been studied.

Meanwhile, in recent years, with the reduction of the costs for the communication devices, technology of Machine-to-Machine communication (M2M) has been intensively developed, in which devices connected to a network automatically execute control by mutually communicating without human intervention. Especially, Third Generation Partnership Project (3GPP) has advanced, among the M2M, standardization related to optimization of Machine Type Communication (MTC), as a cellular system for the Machine-to-Machine communication (Non-Patent Document 2). In the standardization activity, various types of functions have been studied which are to be adopted for a (MTC) terminal to be used for MTC; and, as an example, an MTC terminal has been studied for which a communication bandwidth is limited so as to reduce costs. As another example, since it is likely that the MTC terminal is to be installed in a location deep inside a building, or a location where it is difficult to perform radio communication due to large building entrance loss, such as underground, the MTC terminal that achieves extended coverage has been studied. Based on the above two examples, terminals are classified into the following four patterns:

1. a terminal that is not provided with a coverage extension function, for which terminal there is no restriction on the communication bandwidth;
2. a terminal that is not provided with a coverage extension function, for which terminal there is a restriction on the communication bandwidth;
3. a terminal that is provided with a coverage extension function, for which terminal there is no restriction on the communication bandwidth; and
4. a terminal that is provided with a coverage extension function, for which terminal there is a restriction on the communication bandwidth.

The MTC Terminal (MTC User Equipment (UE)) is considered to be used in a wide range of fields, such as electric meters, gas meters, vending machines, vehicles, and other industrial devices.

In release 13 of 3GPP, as an example, a study related to the MTC terminal has been started for achieving further cost reduction by restricting a bandwidth to be used to be less than or equal to 180 kHz, which corresponds to a band width of 1 Physical Resource Block (PRB) (Non-Patent Document 3). The Work Item (WI) related to this study is referred to as Narrow Band-Internet of Things (NB-IoT). The NB-IoT aims to achieve coverage expansion that is greater than or equal to 20 dB compared to a usual General Packet Radio Service (GPRS) terminal, and that is greater than or equal to 20 dB compared to a category 1 terminal specified in usual LTE.

There is a need for a technique that allows user equipment to obtain, in addition to information about a frequency band to be used as the starting point (the Anchor PRB), information about a frequency band to be additionally used (the Additional PRB).

SUMMARY

In accordance with embodiments of the invention, a user equipment for communicating with a base station in a radio communication system that support narrow band communication, comprises: a receiver that receives, from the base station via a first frequency band, information for identifying a second frequency band, wherein a synchronization signal and broadcast information are transmitted on the first frequency band, and the synchronization signal and the broadcast information are not transmitted on the second frequency band; and a processor that identifies a center frequency of the second frequency band based on the received information.

In some aspects, the information includes: a bandwidth of a carrier including the first frequency band and the second frequency band; and information indicating a position of a frequency band in which the second frequency band is configured, among a plurality of frequency bands obtained by dividing the bandwidth of the carrier by a resource block length.

In some aspects, the information includes an offset value between a center frequency of the first frequency band and the center frequency of the second frequency band.

In some aspects, the information includes information that indicates a bandwidth of a carrier in which the first frequency band and the second frequency band are configured, and the processor calculates a position of a frequency band in which the second frequency band is configured, among a plurality of frequency bands obtained by dividing the bandwidth of the carrier by a resource block length, using an identifier allocated to the user equipment.

In some aspects, the processor performs timing alignment control or pathloss calculation using any one of a signal transmitted on the first frequency band and a signal transmitted on the second frequency band.

In accordance with embodiments of the invention, a communication method executed by user equipment for communicating with a base station in a radio communication system that supports narrow band communication, comprises: receiving, from the base station via a first frequency band, information for identifying a second frequency band, wherein a synchronization signal and broadcast information are transmitted on the first frequency band, and the synchronization signal and the broadcast information are not transmitted on the second frequency band; and identifying a center frequency of the second frequency band based on the received information.

BRIEF DESCRIPTION OF DRAWINGS

FIG. 2A is a diagram illustrating an example of a carrier configuration when multiple carriers are to be used in the NB-IoT;

FIG. 2B is a diagram illustrating an example of a carrier configuration when multiple carriers are to be used in the NB-IoT;

DETAILED DESCRIPTION

Figure 1:
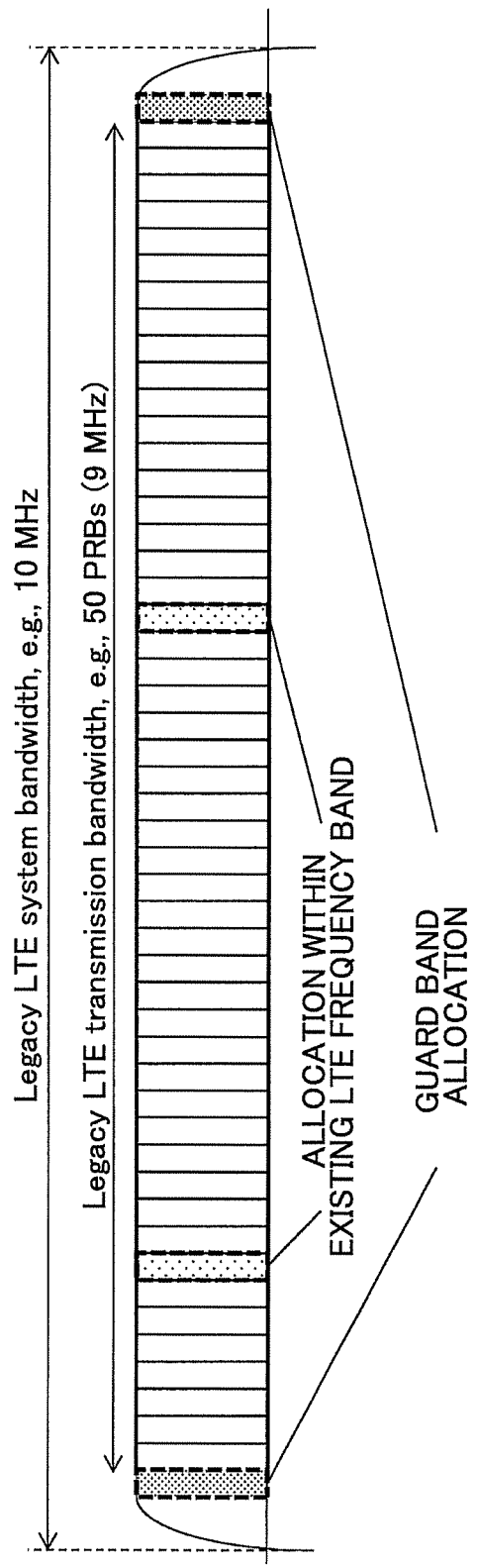
FIG. 1 is a diagram illustrating an example of a configuration according to a method of allocating a bandwidth to be used in NB-IoT.

In the NB-IoT, three scenarios have been studied, as methods of allocating a bandwidth to be used. A first scenario is to configure the bandwidth to be used within a bandwidth that is actually available for communication (e.g., 9 MHz) in a LTE system bandwidth (e.g., 10 MHz) (a scenario using in-band); a second scenario is to configure the bandwidth to be used in a bandwidth corresponding to a guard band in the LTE system bandwidth (a scenario using a guard band); and a third scenario is to use a bandwidth dedicated for the NB-IoT. FIG. 1 shows configuration examples of the bandwidth to be used in the first scenario and the second scenario.

Furthermore, in the NB-IoT, for the scenarios using the in-band and the guard band, a method has been studied which is for performing communication by configuring a plurality of bandwidths to be used. Specifically, for example, as illustrated in (1) of FIG. 2, a method has been studied such that synchronization signals (NB-PSS, NB-SSS) and broadcast information (NB-PBSH) are to be transmitted in each of a plurality of bandwidths to be used, so that user equipment can visit (camp on) any bandwidth to be used.

Additionally, as illustrated in (2) of FIG. 2, as another method, a method has been studied such that the synchronization signals (NB-PSS, NB-SSS) and the broadcast information (NB-PBCH) are to be transmitted only in a part of bandwidths to be used (which is referred to as "Anchor PRB (Anchor PRB), hereinafter) of the bandwidths to be used, and the synchronization signals and the broadcast information are not to be transmitted in the other bandwidths to be used (which is referred to as "Additional PRB (Additional PRB), hereinafter), so that a bandwidth to be used, which can be visited by user equipment, is to be restricted. In the method of (2) of FIG. 2, the user equipment belonging to the Anchor PRB is to transition to the Additional PRB to perform communication based on an indication, etc., from a base station eNB.

Here, in usual LTE, a resource position (a position of a resource block in a frequency direction, etc.) is determined using a center frequency of a system bandwidth as a reference. It follows that, if a center frequency of the Anchor PRB is the same as the center frequency of the system bandwidth, information about the Additional PRB (e.g., a center frequency and a frequency band) can be reported to user equipment UE simply by using the center frequency of the system bandwidth as the reference.

Figure 3:
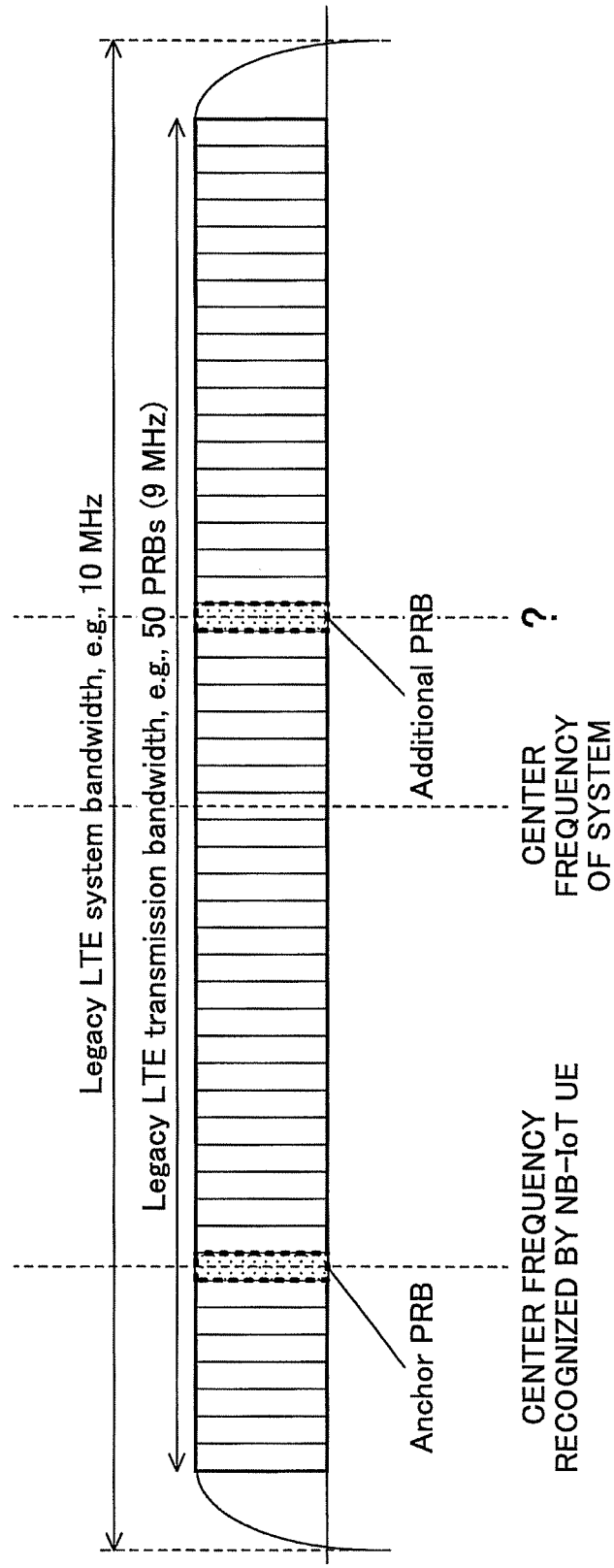
FIG. 3 is a diagram for illustrating a difference between the center frequencies of an anchor PRB and the system bandwidth of a conventional LTE system.

However, as illustrated in FIG. 3, in NB-IoT, the center frequency of the Anchor PRB may not be equal to the center frequency of usual LTE. Namely, with the scheme of usual LTE, the information about the Additional PRB (e.g., the center frequency and the frequency band) may not be reported to the user equipment.

Embodiments of the present disclosure are described below by referring to the drawings. Note that the embodiments described below are merely examples; and embodiments of the present disclosure are not limited to the below-described embodiments. For example, it is assumed that the radio communication system according to one or more embodiments of the invention is a system based on a scheme conforming to LTE; however, the present disclosure is not limited to LTE, and can be applied to another scheme. Note that, in the present specification and the claims, "LTE" is used in a broad meaning including, not only a communication scheme corresponding to release 8 or 9 of 3GPP, but also release 10, 11, 12, 13, or on or after release 14, which corresponding to the fifth generation communication scheme, of 3GPP.

Furthermore, the base station and the user equipment according to one or more embodiments of the invention are described while assuming that they support the technology studied in the NB-IoT; however, embodiments of the present disclosure are not limited to this, and can be applied to various communication schemes.

In the following description, "PRB" is used while assuming that it implies "a bandwidth used in the NB-IoT (e.g., 180 kHz)" or "a carrier provided with a bandwidth used in the NB-IoT." However, embodiments of the invention do not imply that the communication bandwidth is limited to 180 kHz. For example, it can be applied to a radio communication system for performing communication in a frequency band that is less than or equal to 180 kHz. Additionally, the anchor PRB may be referred to as an anchor carrier (Anchor Carrier); and the additional carrier may be referred to as an additional carrier (Additional Carrier).

System Configuration

Figure 4:
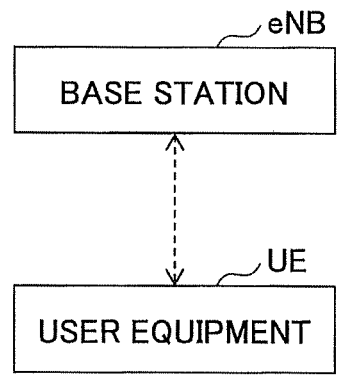
FIG. 4 is a diagram illustrating an example of a configuration of a radio communication system according to one or more embodiments of the invention.

FIG. 4 is a diagram illustrating a configuration example of the radio communication system according to one or more embodiments of the invention. As illustrated in FIG. 4, the radio communication system according to one or more embodiments of the invention includes a base station eNB and user equipment UE. In the example of FIG. 4, one base station eNB and one unit of user equipment UE are depicted; however, a plurality of base stations eNBs may be provided and a plurality of units of user equipment UEs may be provided.

The base station eNB and the user equipment UE perform Downlink (DL) and Uplink (UL) communication using an anchor PRB or an additional PRB. More specifically, the base station eNB transmits a synchronization signal and broadcast information with the anchor PRB. Furthermore, the user equipment UE detects the synchronization signal and the broadcast information transmitted through the anchor PRB by performing cell search; and the user equipment UE starts communication with the base station eNB through the anchor PRB by executing a random access procedure, etc.

In one or more embodiments of the invention, the synchronization signal transmitted through the anchor PRB may be referred to as the Narrow Band-Primary Synchronization Signal (NB-PSS) or the Narrow Band-Secondary Synchronization Signal (NB-SSS); or may be referred to as the PSS or the SSS similar to usual LTE. Furthermore, a channel for transmitting the broadcast information through the anchor PRB may be referred to as the Narrow Band-Physical Broadcast Channel (NB-PBCH); or may be referred to as the PBCH similar to usual LTE.

The base station eNB may be configured so as to support the communication scheme in the existing LTE; or may be configured so as to only support a function related to the NB-IoT. The user equipment UE may be referred to as an NB-IoT terminal; an MTC terminal; or user equipment UE with a limited frequency band to be supported.

Processing Procedure

Processing Sequence

Figure 5:
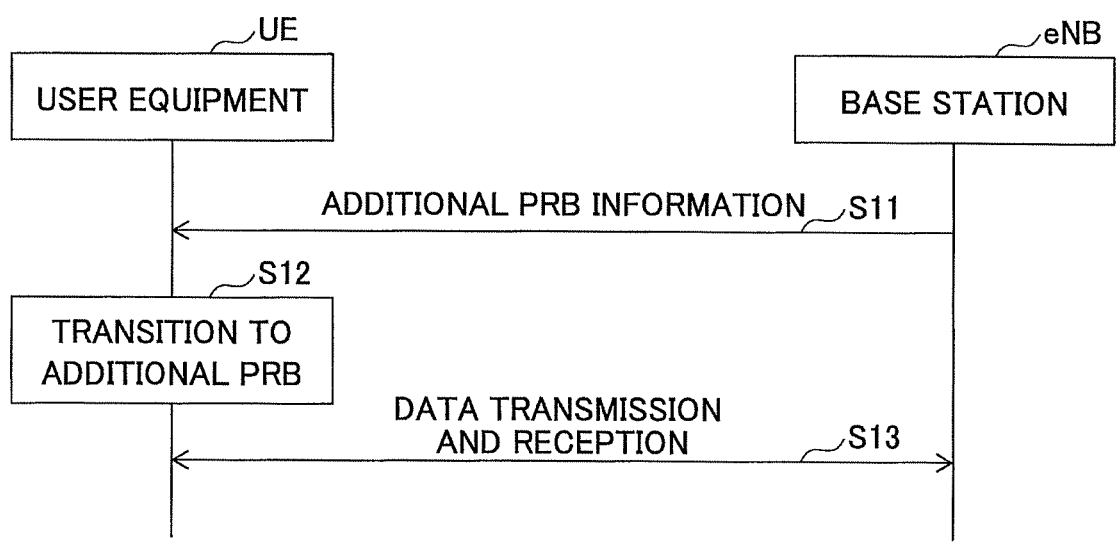
FIG. 5 is a sequence diagram illustrating an example of a processing procedure in the radio communication system according to one or more embodiments of the invention.

Next, a processing procedure performed by the wireless communication system according to one or more embodiments of the invention is described by using FIG. 5. In one or more embodiments of the invention, the user equipment UE performs communication with the base station eNB through the anchor PRB, and performs communication with the eNB by transitioning to the additional PRB according to an indication, etc., by the base station eNB. For that reason, it is required for the user equipment UE to store, in advance, information related to the additional PRB (e.g., the center frequency of the additional PRB) prior to transition from the anchor PRB to the additional PRB. Thus, in one or more embodiments of the invention, the base station eNB reports (S11), in advance, the information related to the additional PRB (which is referred to as "additional PRB information," hereinafter) to the user equipment UE through the anchor PRB. The base station eNB may report, to the user equipment UE, the additional PRB information using broadcast information (SIB) or an RRC message. More specifically, the broadcast information may be the SIB1 or the SIB2. Additionally, the RRC message may be, more specifically, RRC Connection Reconfiguration, RRC Connection Release, RRC Connection Setup, or RRC Connection Reestablishment. In response to a predetermined trigger (e.g., a command from the base station eNB, etc.), the user equipment UE switches a frequency of a Radio Frequency (RF) functional unit to transition from the anchor PRB to the additional PRB (S12), and performs communication with the base station eNB (S13).

Method of Reporting Information Related to the Additional PRB

Subsequently, a method is specifically described which is for transmitting information related to the additional PRB from the base station eNB to the user equipment UE in the processing procedure of step S11 of FIG. 5.

Reporting Method (Version 1)

In the reporting method (version 1), the base station eNB reports, to the user equipment UE, "an operating band," "an EARFCN of a DL carrier," "a bandwidth of the DL carrier," and "an additional PRB index," as the additional PRB information. The user equipment UE identifies DL and UL center frequencies of the additional PRB using these information items. Furthermore, the user equipment UE determines that the UL bandwidth of the additional PRB is a predetermined bandwidth (e.g., 180 kHz).

In the "operating band," information indicating a band of a LTE carrier is configured. For example, the E-UTRA Operation Band is configured, which is specified in Table 5.7.3-1, etc., of TS36.101 of 3GPP. Note that the LTE carrier means a carrier of usual LTE, which includes the anchor PRB and the additional PRB.

In the "EARFCN of the DL carrier," an E-UTRA Absolute Radio Frequency Channel Number (EARFCN) of the DL carrier of the LTE carrier is configured.

In the "bandwidth of the DL carrier," a bandwidth of the DL carrier of the LTE carrier (e.g., 5 MHz, 10 MHz, 20 MHz, etc.) is configured. Note that, in the "bandwidth of the DL carrier," a number of PRBs that form a bandwidth to be actually used for transmission (transmission bandwidth (Transmission Bandwidth)) may be configured.

In the "additional PRB index," an index of a PRB in which an additional PRB is allocated is configured. Here, the index of the PRB means one of indexes added to a respective plurality of PRBs forming the bandwidth of the LTE carriers in a frequency direction in an order from zero. For example, in the LTE carrier illustrated in FIG. 6, in the system frequency band (10 MHz), a frequency band (9 MHz) that is available for actual transmission and reception is formed of 50 PRBs, so that indexes from 0 to 49 can be assigned to respective PRBs in this order.

A Specific Example of the Method for Identifying the Center Frequency of the Additional PRB A specific example of the method for the user equipment UE to identify the center frequency of the additional PRB is described below.

Figure 6:
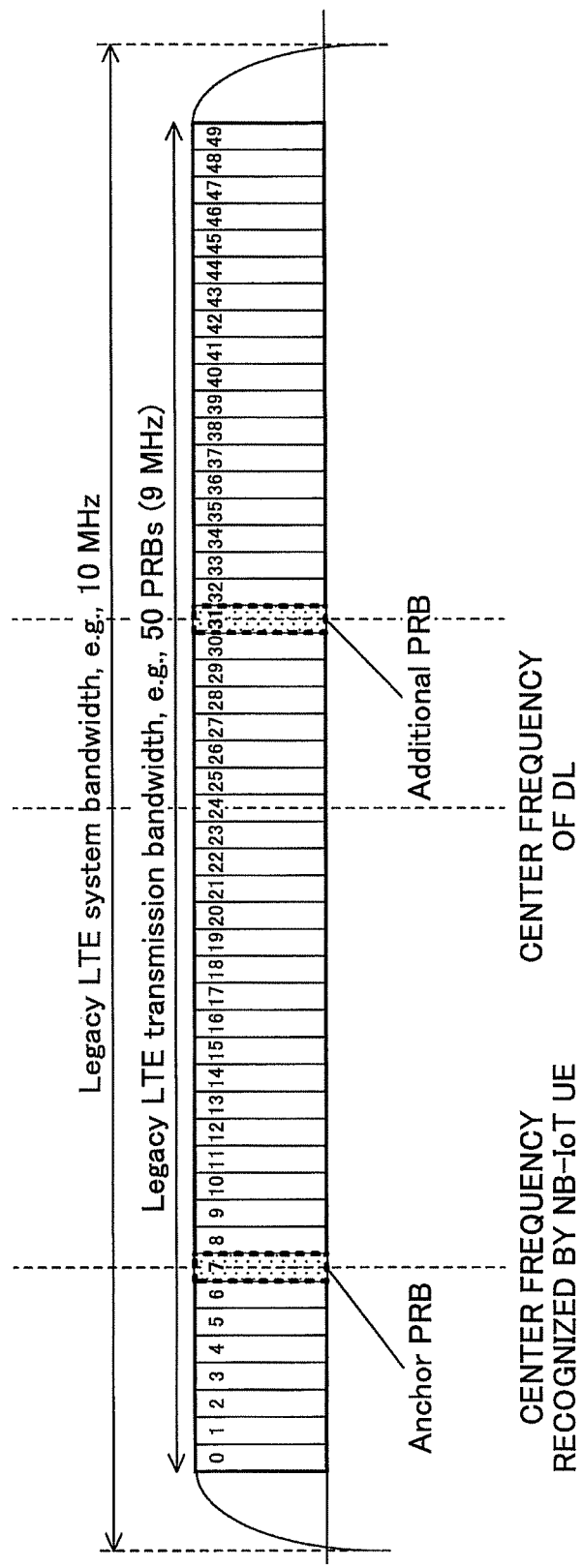
FIG. 6 is a diagram for illustrating a method of reporting information about an additional carrier (version 1) according to one or more embodiments of the invention.

First, the user equipment UE calculates the center frequency of the DL carrier using the "operating band" and the "EARFCN of the DL carrier." The method of calculating the center frequency of the DL carrier is specified, for example, in 5.7.3 of TS 36.101 (Non-Patent Document 4). Subsequently, the user equipment UE identifies the number of PRBs that exist in the bandwidth to be actually used for transmission in the DL carrier using the "bandwidth of the DL carrier," and identifies the index of the PRB corresponding to the center frequency of the DL carrier by assigning the indexes to respective PRBs in the frequency direction in the order from zero. In the example of FIG. 6, the PRB corresponding to the center frequency of the DL carrier is the PRB with the index 24.

Subsequently, the user equipment UE calculates a difference between the index of the PRB corresponding to the center frequency of the DL carrier and the index that is configured as the "additional PRB index," and calculates the DL center frequency of the additional PRB using the calculated difference. In the example of FIG. 6, since the additional PRB index is 31, the DL center frequency of the additional PRB can be calculated to be the position that is separated from the center frequency of the DL carrier by "(31-24)×180 kHz=1260 kHz, (180 kHz is the bandwidth of 1 PRB)." Furthermore, the user equipment UE determines that the DL bandwidth of the additional PRB is the bandwidth of 1 PRB (180 kHz).

The user equipment UE can calculate the UL center frequency of the additional PRB by a similar procedure. As a specific example, the user equipment UE calculates the center frequency of the UL carrier using the "operating band" and the "EARFCN of the DL carrier." Once the "operating band" and the center frequency of the DL carrier are determined, the center frequency of the UL carrier can be uniquely determined in accordance with a default value that is predetermined in the standard specification. Specifically, it is specified in Table 5.7.4-1 of TS36.101. Note that, in one or more embodiments of the invention, the base station eNB may report, to the user equipment UE, the "EARFCN of the UL carrier," as the additional PRB information. Then, a case can be supported where the center frequency of the UL carrier is a value other than the default value specified in the standard specification.

Subsequently, the user equipment UE identifies the number of PRBs that exist in the bandwidth that is actually used for transmission in the UL carrier while regarding that the "bandwidth of the DL carrier" is the bandwidth of the UL carrier; and identifies the index of the PRB corresponding to the center frequency of the UL carrier by assigning indexes to respective PRBs in the frequency direction in the order from zero. Note that, in one or more embodiments of the invention, the base station eNB may report, to the user equipment UE, the "bandwidth of the UL carrier," as the additional PRB information. Then, a case can be supported where the bandwidth of the UL carrier differs from the bandwidth of the DL carrier.

Subsequently, the user equipment UE calculates a difference between the index of the PRB corresponding to the center frequency of the UL carrier and the index that is configured as the "additional PRB index," and calculates the UL center frequency of the additional PRB using the calculated difference. If the UL carrier has the configuration shown in FIG. 6, since the additional PRB index is 31, the UL center frequency of the additional PRB can be calculated to be the position that is separated from the center frequency of the UL carrier by "(31-24)×180 kHz=1260 kHz."

Supplemental Items Regarding the Reporting Method (Version 1)

The base station eNB may separately report, to the user equipment UE, the "additional PRB index" corresponding to DL and the "additional PRB index" corresponding to UL, as the additional PRB information. Furthermore, the user equipment UE may calculate the DL and UL center frequencies of the additional PRB using the "additional PRB index" corresponding to DL and the "additional PRB index" corresponding to UL, respectively. In this manner, the base station eNB can configure the position of the additional PRB to be different positions for DL and UL.

Furthermore, the base station eNB may additionally report, to the user equipment UE, the "anchor PRB index," as the additional PRB information. By receiving the "anchor PRB index," the user equipment UE can identify the index of the anchor PRB to which the own device belongs. Furthermore, the user equipment UE may calculate the center frequency of the additional PRB using a difference between the "anchor PRB index" and the index that is configured to be the "additional PRB index" and the DL/UL center frequencies of the anchor PRB to which the own device belongs. For example, in the example of FIG. 6, a difference of the indexes between the index (7) of the anchor PRB and the index (31) of the additional PRB is PRBs, so that the user equipment UE can calculate that the DL/UL center frequencies of the additional PRB are positions that are separated from the DL/UL center frequencies of the anchor PRB by 4320 kHz (24 PRBs×180 kHz), respectively. Note that, for the "anchor PRB index, the base station eNB may also separately report, to the user equipment UE, the "anchor PRB index" corresponding to DL and the "anchor PRB index" corresponding to the UL. Note that the user equipment UE can retrieve the DL/UL center frequencies of the anchor PRB to which the own device belongs from broadcast information, etc., transmitted on the anchor PRB.

When the anchor PRB or the additional PRB is to be configured in the guard band, the base station eNB may configure a bandwidth obtained by adding the bandwidth to be actually used for transmission and the bandwidth corresponding to the guard band to the "bandwidth of the DL carrier" (or the number of the PRBs forming the total bandwidth). The user equipment UE can identify the center frequency of the additional PRB configured in the guard band by a method that is the same as that of the above-described "specific example of the method of identifying the center frequency of the additional PRB."

Reporting Method (Version 2)

In the reporting method (Version 2), the base station eNB reports, to the user equipment UE, "an offset value from the center frequency of the anchor PRB," which indicates a difference between the center frequency of the anchor PRB and the center frequency of the additional PRB, as the additional PRB information. The user equipment UE identifies DL and UL center frequencies of the additional PRB using the center frequency of the identified anchor PRB and the "offset value from the center frequency of the anchor PRB." Furthermore, the user equipment UE determines that the UL bandwidth of the additional PRB is a predetermined bandwidth (e.g., 180 kHz). Note that the user equipment UE can obtain the DL/UL center frequencies of the anchor PRB to which the own device belongs from broadcast information, etc., transmitted on the anchor PRB.

Figure 7:
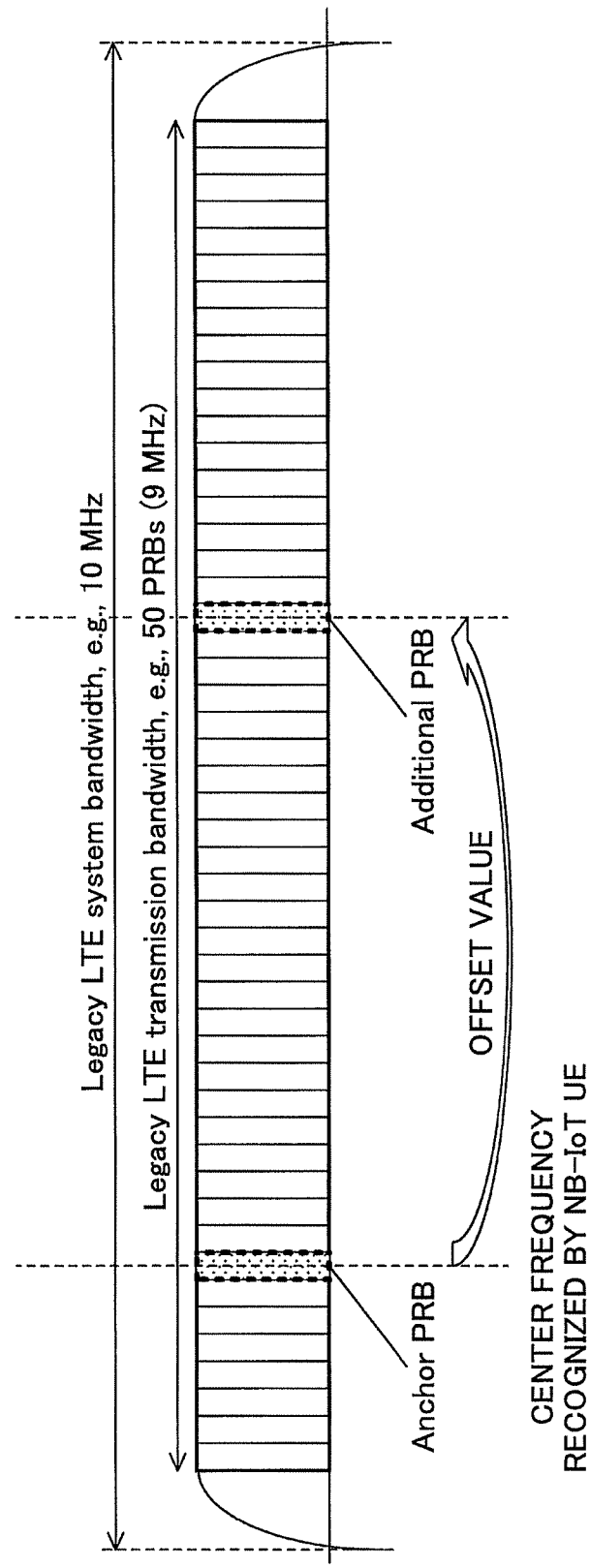
FIG. 7 is a diagram for illustrating a method of reporting the information about the additional carrier (version 2) according to one or more embodiments of the invention.

The "offset value from the center frequency of the anchor PRB" may be represented by an integral multiple of the bandwidth per 1 PRB (180 kHz). For example, when the anchor PRB and the additional PRB are configured at positions shown in FIG. 7, the "offset value from the center frequency of the anchor PRB" is set to "+24."

Furthermore, the "offset value from the center frequency of the anchor PRB" may be represented by an integral multiple of 100 kHz. For performing a cell search, the user equipment UE often performs the search at 100 kHz intervals. Consequently, by representing the "offset value from the center frequency of the anchor PRB" by the integral multiple of 100 kHz, the user equipment UE can quickly adjust the frequency setting of the RF functional unit to the frequency of the additional PRB. Note that, in this case, it is assumed that the position of the additional PRB may be allowed not to match the position of the PRB of the LTE carrier.

Furthermore, the base station eNB may report, to the user equipment UE, the "anchor PRB index" and the "additional PRB index" described in the reporting method (version 1), instead of the "offset value from the center frequency of the anchor PRB," and the user equipment UE may calculate the offset value for itself.

Note that the user equipment UE may determine that the "offset value from the center frequency of the anchor PRB" is an offset value that is common between DL and UL. Furthermore, the base station eNB may separately report, to the user equipment UE, the "offset value from the center frequency of the anchor PRB" corresponding to the DL and the "offset value from the center frequency of the anchor PRB" corresponding to the UL.

Modified Example of the Reporting Method
(Version 1)

In the reporting method (version 1), the center frequency of the additional PRB is identified using the position of the physical PRB; however, in the modified example of the reporting method (version 1), logical indexes are used, as the indexes identifying the anchor PRB and the additional PRB.

More specifically, information for uniquely associating indexes of PRBs (PRB indexes) forming a frequency band available for actual transmission and reception in the UL/DL system frequency band with logical indexes to be assigned to PRBs to be candidates of the anchor PRB and the additional PRB (which are referred to as the "VRB index," hereinafter) is retained, in advance, between the base station eNB and the user equipment UE.

Figure 8:
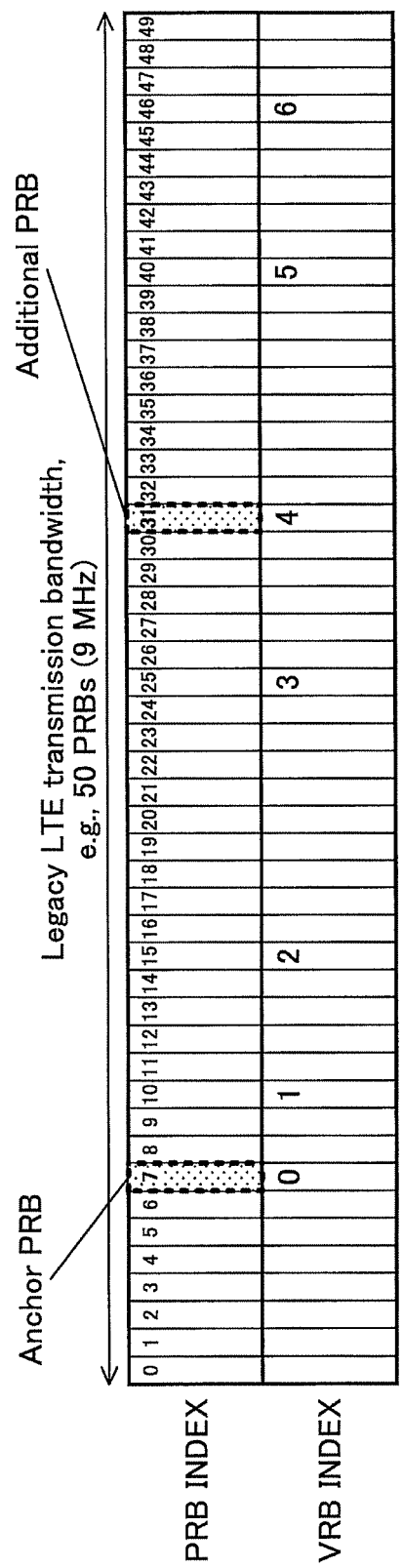
FIG. 8 is a diagram illustrating a method of reporting the information about the additional carrier (version 3) according to one or more embodiments of the invention.

More specifically, for example, as illustrated in FIG. 8, the PRBs with the indexes "7," "10," "15," "25," "31," "40," and "46" are associated, in advance, with the VRB indexes "0" through "6," respectively.

The PRB indexes and the VRB indexes may be associated in common between DL and UL; or may be independently associated between DL and UL. Furthermore, the VRB index "0" may be associated with the index of the PRB corresponding to the anchor PRB.

The base station eNB reports, to the user equipment UE, the "operating band," the "EARFCN of the DL carrier," the "bandwidth of the DL carrier," and the "additional PRB index," as the additional PRB information. Furthermore, for the "additional PRB index," a VRB index is configured.

The user equipment UE identifies the PRB index corresponding to the VRB index configured for the "additional PRB index" using the information for uniquely associating the PRB indexes with the VRB indexes; and identifies the center frequency of the additional PRB by the method similar to that of the "specific example of the method of identifying the center frequency of the additional PRB" described in the reporting method (version 1).

Note that, in the modified example of the reporting method (version 1), for each user equipment UE, the additional PRB may be distributed. Specifically, the base station eNB may transmit the additional PRB information to the user equipment UE without enclosing the "additional PRB index," and the user equipment UE may calculate the VRB index of the additional PRB by substituting its own UE ID in a predetermined calculation formula. For example, the user equipment UE may calculate the VRB index of the additional PRB allocated to itself using a calculation formula, "VRB index=UE_ID mod the number of VRBs that are candidates of the additional PRB." For example, the UE_ID may be a Radio Network Temporary Identity (RNTI), an International Mobile Subscriber Identity (IMSI), an SAE-Temporary Mobile Subscriber Identify (S-TMSI), etc. For example, in FIG. 8, the number of the VRBs to be candidates of the additional PRB is 6 (i.e., VRBs "1" to "6,") and each user equipment UE can identify, by the above-described calculation formula, one of the PRBs corresponding to the VRB indexes "1" through "6," as the additional PRB. In this manner, the additional PRB to be allocated to each user equipment UE is to be distributed, and the congestion of the additional PRBs can be avoided.

Modified Example of the Reporting Method
(Version 2)

In the reporting method (version 2), the information for uniquely associating the PRB indexes with the VRB indexes is retained, in advance, between the user equipment UE and the base station eNB, and the "offset value from the center frequency of the anchor PRB" may be represented as a difference of VRB indexes. For example, in FIG. 8, when the anchor PRB is configured at the position with the VRB index "0" and the additional PRB is configured at the position with the VRB index "4," the "offset value from the center frequency of the anchor PRB" may be set to +4 VRBs. Note that, in this case, it may be fixedly specified that the VRB index of the anchor PRB is "0," or the VRB index of the anchor PRB may be reported from the base station eNB to the user equipment UE.

Furthermore, in the reporting method (version 2), the additional PRB may also be distributed for each user equipment UE. For example, the base station eNB may report only the VRB index of the anchor PRB, as the additional PRB information; and the user equipment UE may calculate the VRB index of the additional PRB by substituting its own UEID in a predetermined calculation formula. The user equipment UE can calculate the actual offset value (the number of the PRBs) using information for uniquely associating the PRB indexes with the VRB indexes, the VRB index of the anchor PRB reported from the base station eNB, and the calculated VRB index of the additional PRB.

TA Control and Calculation of a Pathloss

In one or more embodiments of the invention, when the additional PRB is not configured, the user equipment UE communicates with the base station eNB through the anchor PRB; and when the additional PRB is configured by the additional PRB information, the user equipment UE communicates with the base station eNB through one of the anchor PRB and the additional PRB.

Consequently, as the DL PRB to be referred to for performing the UL Timing Alignment (TA) control, the user equipment UE may always use the anchor PRB regardless of whether the additional PRB is configured; or may use the additional PRB when the additional PRB is configured. Furthermore, when the additional PRB is configured, it can be indicated (configured) from the base station eNB to the user equipment UE as to whether the anchor PRB is to be used or the additional PRB is to be used, as the DL PRB to be referred to for performing the TA control.

Similarly, as the DL PRB to be referred to for calculating the pathloss (Pathloss) for reporting the Power Head Room (PHR) to the base station eNB, the user equipment UE may always use the anchor PRB regardless of presence or absence of the configuration of the additional PRB; or when the additional PRB is configured, the additional PRB may be used. Furthermore, when the additional PRB is configured, it can be indicated (configured) from the base station eNB to the user equipment UE as to whether the anchor PRB is to be used or the additional PRB is to be used, as the DL PRB to be referred to for calculating the pathloss.

Figure 9:
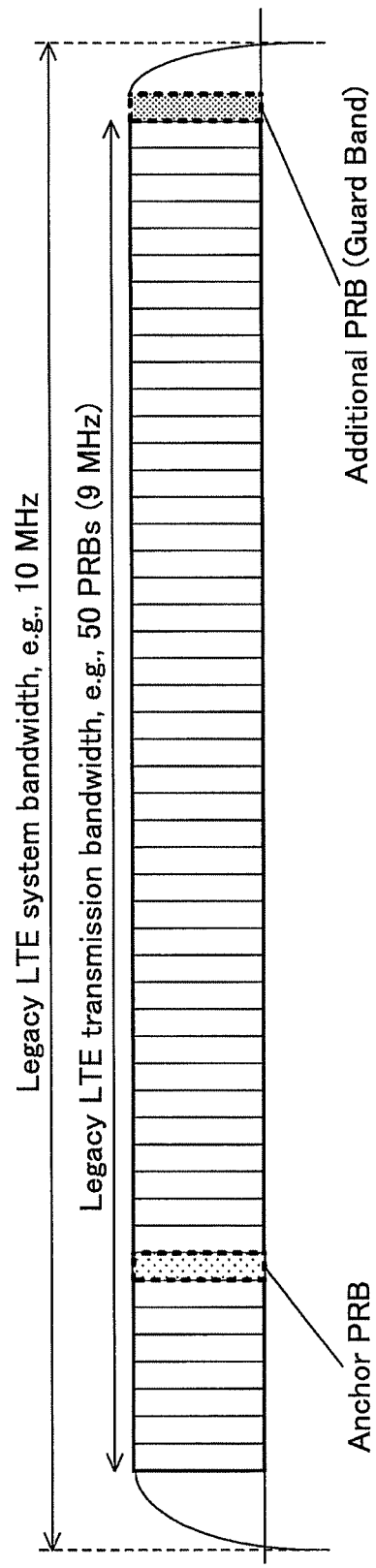
FIG. 9 is a diagram illustrating a case in which the additional carrier is configured in a guard band according to one or more embodiments of the invention.

Operation of the User Equipment when the Additional PRB is Configured in the Guard Band In one or more embodiments of the invention, when the additional PRB is configured in the guard band (e.g., the case where the additional PRB is configured in the resource shown in FIG. 9), the signal mapping at the physical layer in the additional PRB may be a new configuration optimized for signal transmission with 1 PRB, or may be a configuration similar to that of usual LTE. Furthermore, the base station eNB may report (set), to the user equipment, whether the signal mapping at the physical layer in the additional PRB is to be the new configuration or the configuration that is the same as that of usual LTE.

When the new configuration is to be adopted, the base station eNB may apply the CRS configuration and the channel configuration of the PDCCH, which are optimized for signal transmission with 1 PRB, to the additional PRB so as to transmit signals of the PDCCH NB-PDCCH), the PDSCH (NB-PDSCH), and various types of RSs (NB-RSs).

When the configuration that is the same as that of usual LTE is to be adopted and a DL signal is to be received on the additional PRB, the user equipment UE may regard that the CRS configuration and the channel configuration of the PDCCH are applied, which are the same as those of usual LTE, so as to perform a process, such as rate matching.

Functional Configuration

Examples of functional configurations of the user equipment UE and the base station eNB are described, which execute the above-described processing procedures. However, a part of the above-described processes of the user equipment UE and the base station eNB (e.g., only one or more specific embodiments, etc.) may be executable.

User Equipment

Figure 10:
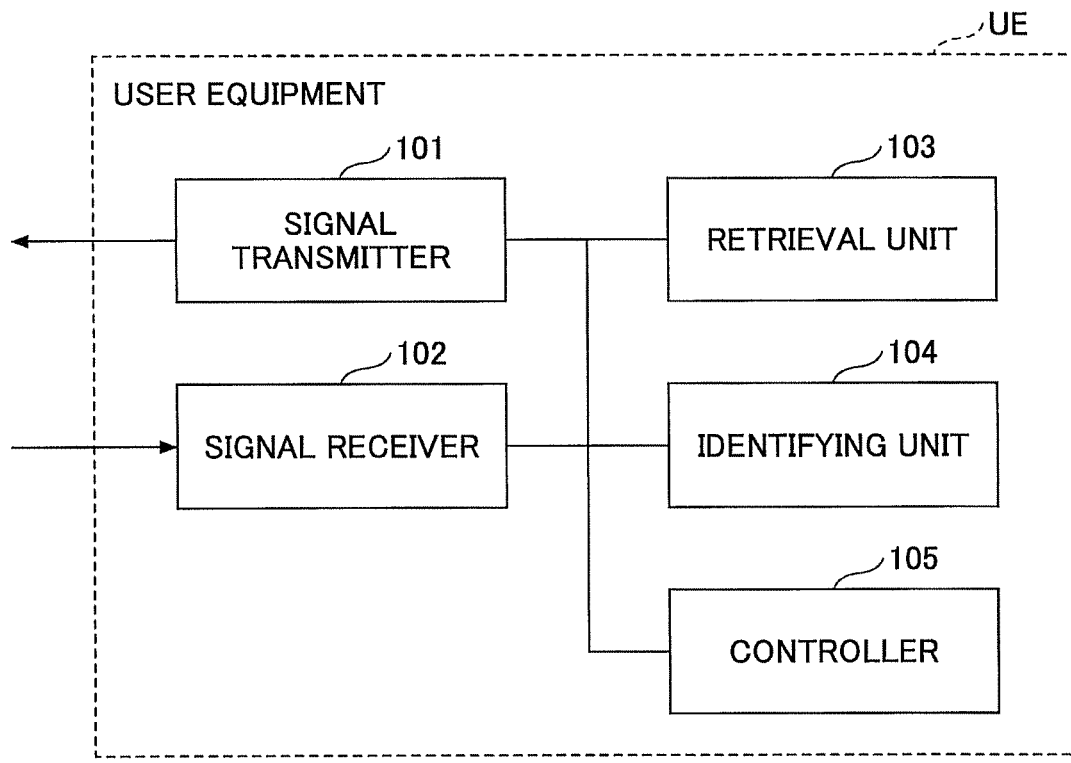
FIG. 10 is a diagram illustrating an example of a functional configuration of user equipment according to one or more embodiments of the invention.

FIG. 10 is a diagram illustrating an example of a functional configuration of the user equipment according to one or more embodiments of the invention. As illustrated in FIG. 10, the user equipment UE includes a signal transmitter 101; a signal receiver 102; a retrieval unit 103; an identifying unit 104; and a controller 105. FIG. 10 only shows, in the user equipment UE, the functional units that are particularly related to one or more embodiments of the present disclosure, and it includes, at least, a function, which is not depicted, for performing an operation conforming to the LTE. Furthermore, the functional configuration depicted in FIG. 10 is merely an example. The functional division and the names of the functional units may be any division and names, provided that the operation according to one or more embodiments of the invention can be performed.

The signal transmitter 101 is provided with a function for generating various types of signals to be transmitted from the user equipment UE, and for wirelessly transmitting them. The signal receiver 102 is provided with a function for receiving various types of radio signals from the base station eNB. Each of the signal transmitter 101 and the signal receiver 102 is provided with a packet buffer, and it is assumed that each of the signal transmitter 101 and the signal receiver 102 performs the processes of the layer 1 (PHY), the layer 2 (MAC, RLC, PDCP), and the layer 3 (RRC) (however, the processes are not limited to these). Furthermore, the signal transmitter 101 and the signal receiver 102 are provided with functions for transmitting and receiving various types of radio signals through the additional PRB by changing the frequency of the RF functional unit based on the center frequency of the additional PRB identified by the identifying unit 104.

The retrieval unit 103 is provided with a function for retrieving, from the base station eNB, the additional PRB information through the anchor PRB.

The identifying unit 104 is provided with a function for identifying the center frequency of the additional PRB based on the additional PRB information. Furthermore, when a VRB index is configured in the additional PRB information, as the information indicating the position of the frequency band at which the additional PRB is configured, the identifying unit 104 may identify the position (PRB index) of the frequency band at which the additional PRB is configured based on the information for uniquely associating the PRB indexes with the VRB indexes, which is stored in a memory, etc., in advance.

Furthermore, the identifying unit 104 may identify the position (PRB index) of the frequency band at which the additional PRB is configured using the UE_ID of the user equipment UE itself and the predetermined calculation formula.

The controller 105 is provided with a function for performing the TA control or for calculating the pathloss using any one of a DL signal transmitted on the anchor PRB or a DL signal transmitted on the additional PRB.

Base Station

Figure 11:
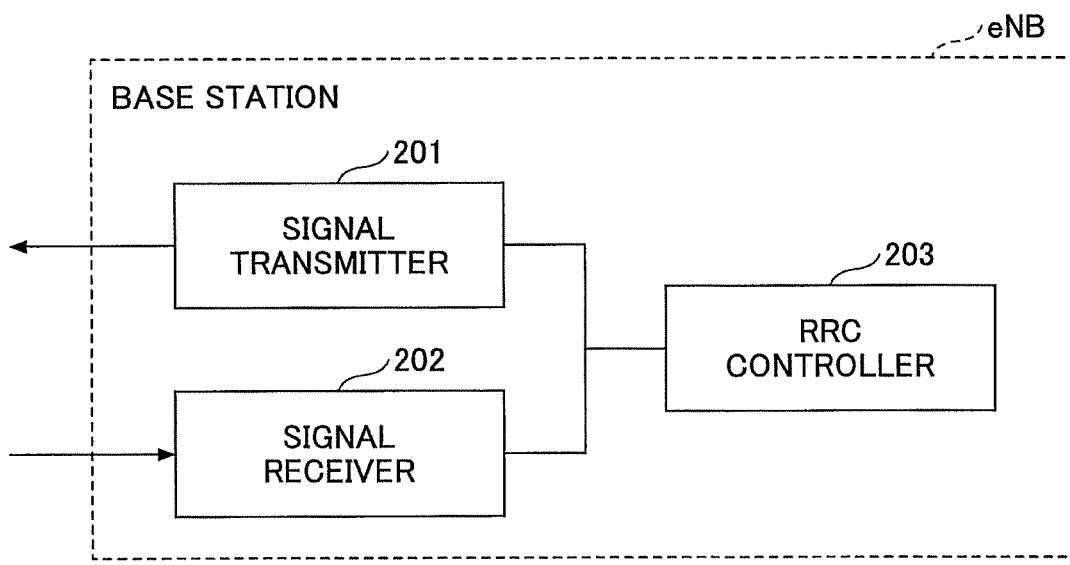
FIG. 11 is a diagram illustrating an example of a functional configuration of a base station according to one or more embodiments of the invention.

FIG. 11 is a diagram illustrating an example of a functional configuration of the base station according to one or more embodiments of the invention. As illustrated in FIG. 11, the base station eNB includes a signal transmitter 201; a signal receiver 202; and an RRC controller 203. FIG. 11 only shows, in the base station eNB, the functional units that are particularly related to the embodiments of the present disclosure, and it includes, at least, a function, which is not depicted, for performing an operation conforming to the LTE. Furthermore, the functional configuration depicted in FIG. 11 is merely an example. The functional division and the names of the functional units may be any division and names, provided that the operation according to one or more embodiments of the invention can be performed.

The signal transmitter 201 is provided with a function for generating various types of signals to be transmitted from the base station eNB, and for wirelessly transmitting them. The signal receiver 202 is provided with a function for wirelessly receiving various types of signals from the user equipment UE, and for retrieving higher layer signals from the received physical layer signals. Each of the signal transmitter 201 and the signal receiver 202 is provided with a packet buffer, and it is assumed that each of the signal transmitter 201 and the signal receiver 202 performs the processes of the layer 1 (PHY), the layer 2 (MAC, RLC, PDCP), and the layer 3 (RRC) (however, the processes are not limited to these). Furthermore, the signal transmitter 201 and the signal receiver 202 are provided with functions for communicating with the user equipment UE using the anchor PRB and the additional PRB.

The RRC controller 203 is provided with a function for reporting (configuring) additional PRB information to the user equipment UE using broadcast information or an RRC message.

Each of the above-described functional configurations of the user equipment UE and the base station eNB may be entirely implemented by a hardware circuit (e.g., one or more IC chips); or a part of it may be formed of a hardware circuit and the other part may be implemented by a CPU and a program.

User Equipment

Figure 12:
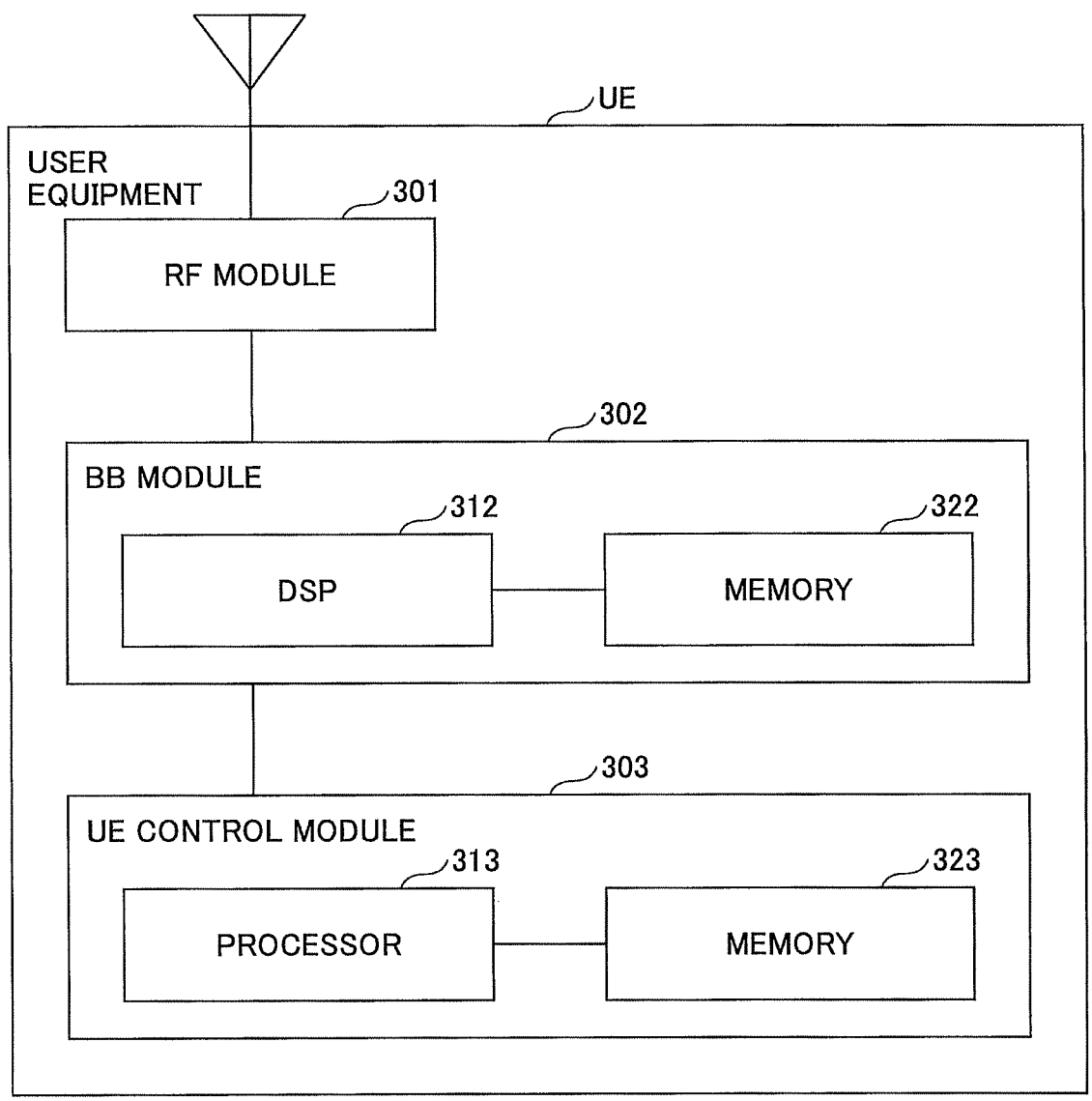
FIG. 12 is a diagram illustrating an example of a hardware configuration of the user equipment according to one or more embodiments of the invention.

FIG. 12 is a diagram illustrating an example of a hardware configuration of the user equipment according to one or more embodiments of the invention. FIG. 12 shows a configuration closer to an implementation example compared to FIG. 10. As illustrated in FIG. 12, the user equipment UE includes a Radio Frequency (RF) module 301 that executes a process related to a radio signal; a Base Band (BB) processing module 302 that performs baseband signal processing; and a UE control module 303 that performs a process of a higher layer, etc.

The RF module 301 generates a radio signal to be transmitted from an antenna by applying a D/A (Digital-to-Analog) conversion; modulation; a frequency conversion; power amplification, and so forth to a digital baseband signal received from the BB processing module 302. Additionally, a digital baseband signal is generated by applying a frequency conversion, an Analog to Digital (A/D) conversion, demodulation, and so forth to a received radio signal; and it is passed to the BB processing module 302. The RF module 301 includes, for example, a part of the signal transmitter 101 and a part of the signal receiver 102, which are illustrated in FIG. 10.

The BB processing module 302 executes a process of mutually converting an IP packet and a digital baseband signal. A Digital Signal Processor (DSP) 312 is a processor that executes signal processing in the BB processing module 302. A memory 322 is used as a work area of the DSP 312. The BB processing module 302 includes, for example, a part of the signal transmitter 101, a part of the signal receiver 102, and the controller 105, which are illustrated in FIG. 10.

The UE control module 303 executes protocol processing of an IP layer, processing of various applications, and so forth. A processor 313 is the processor that executes a process to be executed by the UE control module 303. A memory 323 is used as a work area of the processor 313. The UE control module 303 includes, for example, the retrieval unit 103 and the identifying unit 104, which are illustrated in FIG. 10.

Base Station

Figure 13:
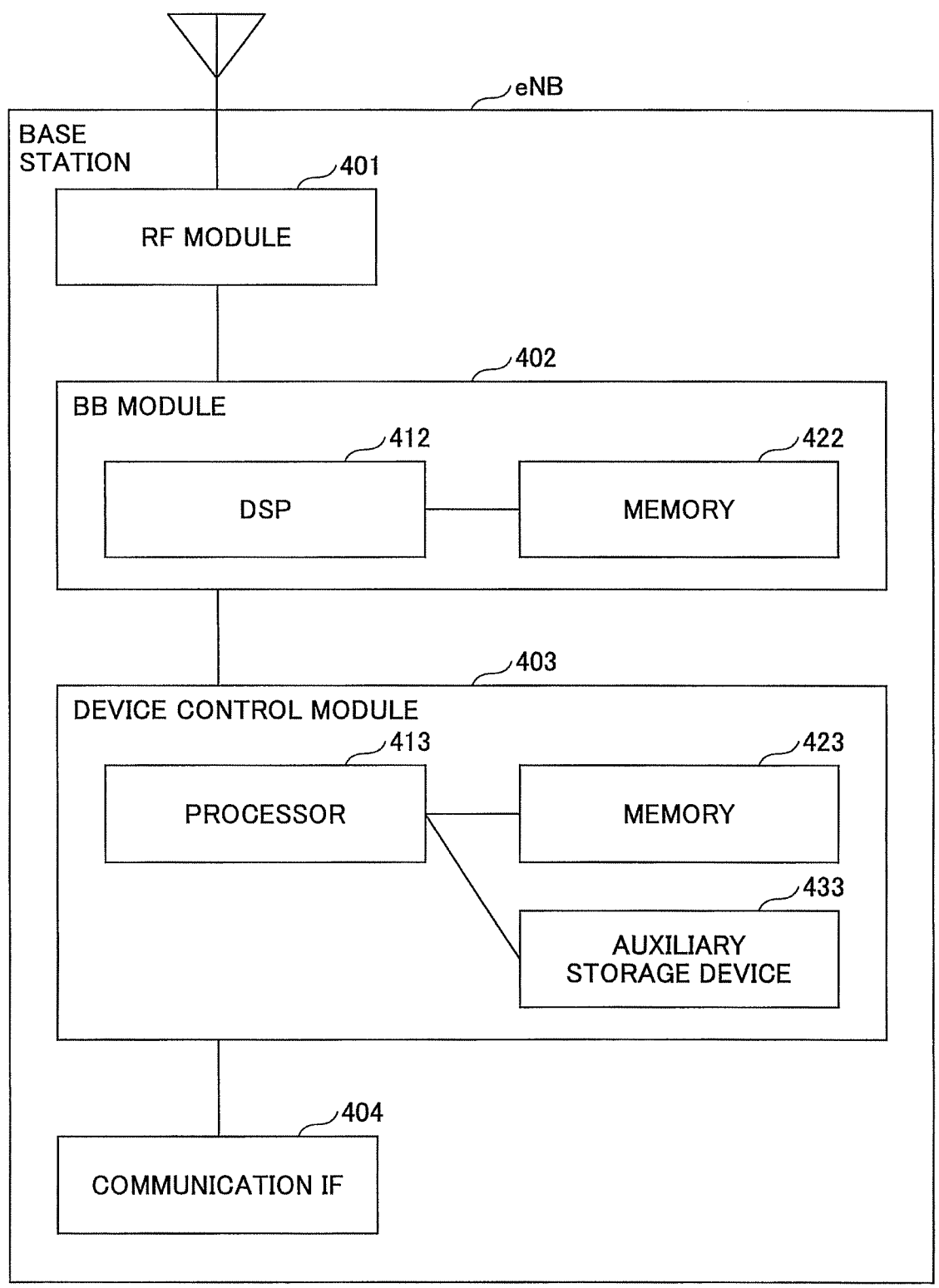
FIG. 13 is a diagram illustrating an example of a hardware configuration of the base station according to one or more embodiments of the invention.

FIG. 13 is a diagram illustrating an example of a hardware configuration of the base station according to one or more embodiments of the invention. FIG. 13 shows a configuration closer to an implementation example compared to FIG. 11. As illustrated in FIG. 13, the base station eNB includes an RF module 401 that executes a process related to a radio signal; a BB processing module 402 that performs baseband signal processing; a device control module 403 that performs a process of a higher layer, etc.; and a communication IF 404 that is an interface for connecting to a network.

The RF module 401 generates a radio signal to be transmitted from an antenna by applying a D/A conversion; modulation; a frequency conversion; power amplification, and so forth to a digital baseband signal received from the BB processing module 402. Additionally, a digital baseband signal is generated by applying a frequency conversion, an A/D conversion, demodulation, and so forth to a received radio signal; and it is passed to the BB processing module 402. The RF module 401 includes, for example, a part of the signal transmitter 201 and a part of the signal receiver 202, which are illustrated in FIG. 11.

The BB processing module 402 executes a process of mutually converting an IP packet and a digital baseband signal. A DSP 412 is a processor that executes signal processing in the BB processing module 402. A memory 422 is used as a work area of the DSP 412. The BB processing module 402 includes, for example, a part of the signal transmitter 201, and a part of the signal receiver 202, which are illustrated in FIG. 11.

The device control module 403 executes protocol processing of an IP layer, Operation and Maintenance (OAM) processing, etc. A processor 413 is the processor that executes a process to be executed by the device control module 403. A memory 423 is used as a work area of the processor 413. The auxiliary storage device 433 is, for example, a HDD, etc., and stores various types of configuration information items, etc., for the base station eNB itself to operate. The device control module 403 includes, for example, the RRC controller 203, which is illustrated in FIG. 11.

Conclusion

As described above, according to one or more embodiments of the invention, there is provided user equipment for communicating with a base station in a radio communication system that supports narrow band communication, the user equipment including a retrieval unit that retrieves, from the base station, information for identifying a second frequency band via a first frequency band, wherein a synchronization signal and broadcast information are transmitted on the first frequency band, and the synchronization signal and the broadcast information are not transmitted on the second frequency band; and an identifying unit that identifies a center frequency of the second frequency band based on the information. With this, a technique is provided that allows user equipment to obtain, in addition to the information about the frequency band to be used as the starting point (the anchor PRB), the information about the frequency band to be additionally used (the additional PRB).

Furthermore, the information may include a bandwidth of a carrier including the first frequency band and the second frequency band; and information indicating a position of a frequency band in which the second frequency band is configured, among a plurality of frequency bands obtained by dividing the bandwidth of the carrier by a resource block length. With this, the user equipment UE can specifically identify the center frequency of the additional PRB.

Furthermore, the information may include an offset value between a center frequency of the first frequency band and the center frequency of the second frequency band. With this, the user equipment UE can specifically identify the center frequency of the additional PRB.

Furthermore, the information may include information indicating a bandwidth of the carrier in which the first frequency band and the second frequency band are configured; and the identifying unit may calculate a position of a frequency band in which the second frequency band is configured, among a plurality of frequency bands obtained by dividing the bandwidth of the carrier by a resource block length, using an identifier to be allocated to the user equipment. With this, the position of the additional PRB is distributed for each user equipment UE, so that the congestion of the additional PRB can be avoided.

Furthermore, a controller may be included that performs timing alignment control or pathloss calculation using any one of a signal transmitted on the first frequency band and a signal transmitted on the second frequency band. With this, the user equipment UE that communicates with the base station eNB using the anchor PRB or the additional PRB can perform the TA control or reporting of the PHR.

Furthermore, according to one or more embodiments of the invention, there is provided a communication method executed by user equipment for communicating with a base station in a radio communication system that supports narrow band communication, the communication method including a step of retrieving, from the base station, information for identifying a second frequency band via a first frequency band, wherein a synchronization signal and broadcast information are transmitted on the first frequency band, and the synchronization signal and the broadcast information are not transmitted on the second frequency band; and a step of identifying a center frequency of the second frequency band based on the information. With this, a technique is provided that allows user equipment to obtain, in addition to the information about the frequency band to be used as the starting point (the anchor PRB), the information about the frequency band to be additionally used (the additional PRB).

Additional Embodiments

The configuration of each device (the user equipment UE/the base station eNB) described in the embodiments of the present disclosure may be a configuration that is implemented by executing a program by a CPU (processor) in the device including the CPU and a memory; may be a configuration that is implemented by hardware provided with a logic for the process described in the above embodiments, such as a hardware circuit; or may be a mixture of programs and hardware.

Reporting of the information is not limited to the aspect/embodiment described in this specification and may be executed by another method. For example, reporting of information may be executed by physical layer signaling (e.g., Downlink Control Information (DCI), Uplink Control Information (UCI), higher layer signaling (e.g., RRC signaling, MAC signaling, and broadcast information (Master Information Block (MIB), System Information Block (SIB))), any other signals, or combination thereof.

The aspect/embodiment described in this specification may be applied to Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system utilizing any other suitable system, and/or a next generation system extended based on these.

Determination or decision may be made by a value represented by one bit (0 or 1); may be made by a Boolean value (Boolean: true or false); or may be made by comparison of numerical values (e.g., comparison with a predetermined value).

Note that the terms described in this specification and/or the terms required for understanding of this specification may be replaced with terms having the same or similar meaning. For example, the channel and/or symbol may be a signal (signal). Further, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The terms "determining (determining)" and "deciding (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "based on" used in the present specification does not mean "based only on" unless otherwise stated particularly. In other words, the expression "based on" means both "based only on" and "based at least on."

Furthermore, processing procedures, sequences, etc., of each aspect/embodiment described in this specification may be exchanged as long as there is no inconsistency. For example, for the methods described in the specification, the elements of the various steps are presented in an exemplary order and are not limited to a specific order presented.

The information, etc., that is input or output may be stored in a specific location (e.g., a memory) and may be managed by a management table. The information, etc., that is input or output may be overwritten, updated, or added. The output information, etc., may be deleted. The input information, etc., may be transmitted to another device.

Reporting of predetermined information (e.g., reporting of "being X") is not limited to reporting that is explicitly executed, and may be executed implicitly (e.g., reporting of the predetermined information is not executed).

Information, signals, etc., described in this specification may be represented using any of various other techniques. For example, data, instructions, commands, information, signals, bits, symbols, chips, etc., described in the entire description may be represented by voltage, current, electromagnetic waves, magnetic fields or magnetic particles, optical fields or photons, or any combination thereof.

Embodiments of the present disclosure are described above; however embodiments of the present invention are not limited to the aforementioned embodiments, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of each of the sequences and flow charts described in the aforementioned embodiments may be re-arranged, provided that they do not contradict. For the convenience of description, the user equipment UE/the base station eNB are described by using the functional block diagrams; however, such devices may be implemented in hardware, software, or combinations thereof. Each of the software to be executed by the processor included in the UE in accordance with one or more embodiments of the present disclosure and the software to be executed by the processor included in the base station eNB may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Note that, in one or more embodiments of the invention, the anchor PRB is an example of the first frequency band. The additional PRB is an example of the second frequency band. The "operating band" and the "EARFCN of the DL carrier" is an example of "a center frequency of a carrier including the first frequency band and the second frequency band." The "additional PRB index" is an example of "the information indicating the position of the frequency band in which the second frequency band is configured, among the plurality of frequency bands obtained by dividing the bandwidth of the carrier by the resource block length." The "offset value from the center frequency of the anchor PRB" is an example of "the offset value between the center frequency of the first frequency band and the center frequency of the second frequency band."

Notes

With regard to the above-described embodiments, embodiments of the invention can also be described as the following notes.

Note 1

User equipment for communicating with a base station in a radio communication system that performs communication in a narrow band, the user equipment comprising:
a retrieval unit that retrieves, from the base station, information for identifying a second frequency band via a first frequency band, wherein a synchronization signal and broadcast information are transmitted on the first frequency band, and the synchronization signal and the broadcast information are not transmitted on the second frequency band; and
an identifying unit that identifies a center frequency of the second frequency band based on the information.

Note 2

The user equipment as described in Note 1, wherein the information includes a center frequency of a carrier including the first frequency band and the second frequency band, a bandwidth of the carrier, and information indicating a position of a frequency band in which the second frequency band is configured, among a plurality of frequency bands obtained by dividing the bandwidth of the carrier by a resource block length.

Note 3

The user equipment as described in Note 1, wherein the information includes an offset value between a center frequency of the first frequency band and the center frequency of the second frequency band.

Note 4

The user equipment as described in Note 1, wherein the information includes information that indicates a center frequency of a carrier in which the first frequency band and the second frequency band are configured and that indicates a bandwidth of the carrier, and
wherein the identifying unit calculates a position of a frequency band in which the second frequency band is configured, among a plurality of frequency bands obtained by dividing the bandwidth of the carrier by a resource block length, using an identifier allocated to the user equipment and a predetermined calculation formula.

Note 5

The user equipment as described in any one of Notes 1 to 4, further comprising:
a controller that performs timing alignment control or pathloss calculation using any one of a signal transmitted on the first frequency band and a signal transmitted on the second frequency band.

Note 6

A communication method executed by user equipment for communicating with a base station in a radio communication system that performs communication in a narrow band, the communication method comprising:
a step of retrieving, from the base station, information for identifying a second frequency band via a first frequency band, wherein a synchronization signal and broadcast information are transmitted on the first frequency band, and the synchronization signal and the broadcast information are not transmitted on the second frequency band; and
a step of identifying a center frequency of the second frequency band based on the information.

What is claimed is:
1. A user equipment for communicating with a base station in a radio communication system that supports narrow band communication, the user equipment comprising:
a receiver that receives, from the base station via a first frequency band, information for identifying a second frequency band, wherein a synchronization signal and broadcast information are transmitted on the first frequency band, and the synchronization signal and the broadcast information are not transmitted on the second frequency band; and
a processor that performs timing alignment control for radio communication on the second frequency band using a signal transmitted on the first frequency band upon detecting that the second frequency band is con- figured, and that identifies a center frequency of the second frequency band based on the received information, wherein the information for identifying the second frequency band includes information indicating a center frequency of an uplink carrier in the second frequency band and information indicating a center frequency of a downlink carrier in the second frequency band, and a separation between the center frequency of the uplink carrier in the second frequency band and the center frequency of the downlink carrier in the second frequency band differs from a separation between a center frequency of an uplink carrier in the first frequency band and a center frequency of a downlink carrier in the first frequency band.

2. A communication method executed by user equipment for communicating with a base station in a radio communication system that supports narrow band communication, the communication method comprising:

receiving, from the base station via a first frequency band, information for identifying a second frequency band, wherein a synchronization signal and broadcast information are transmitted on the first frequency band, and the synchronization signal and the broadcast information are not transmitted on the second frequency band;

identifying a center frequency of the second frequency band based on the information; and performing timing alignment control for radio communication on the second frequency band using a signal transmitted on the first frequency band upon detecting that the second frequency band is configured, wherein the information for identifying the second frequency band includes information indicating a center frequency of an uplink carrier in the second frequency band and information indicating a center frequency of a downlink carrier in the second frequency band, and a separation between the center frequency of the uplink carrier in the second frequency band and the center frequency of the downlink carrier in the second frequency band differs from a separation between a center frequency of an uplink carrier in the first frequency band and a center frequency of a downlink carrier in the first frequency band.

3. The user equipment according to claim 1, wherein the information further includes:

information indicating a position of a frequency band in which the second frequency band is configured, among a plurality of frequency bands obtained by dividing the bandwidth of the carrier by a resource block length.

* * * * *